C. K. VOLCKENING.
BOTTLE WASHER BRUSH.
APPLICATION FILED NOV. 26, 1917.

1,320,513.

Patented Nov. 4, 1919.

INVENTOR.
Charles K. Volckening
BY Walton Harrison
his ATTORNEY

UNITED STATES PATENT OFFICE.

CHARLES K. VOLCKENING, OF BROOKLYN, NEW YORK.

BOTTLE-WASHER BRUSH.

1,320,513.   Specification of Letters Patent.   Patented Nov. 4, 1919.

Application filed November 26, 1917. Serial No. 203,892.

*To all whom it may concern:*

Be it known that I, CHARLES K. VOLCKENING, a citizen of the United States, residing in the city of New York, borough of Brooklyn, in the county of Kings and State of New York, have invented new and useful Improvements in Bottle-Washer Brushes, of which the following is a specification.

My invention relates to bottle washer brushes of a kind suitable for use in connection with streams of water and revolubly driven by power for the purpose of cleaning bottles internally.

Reference is made to the accompanying drawing forming a part of this specification, and in which like letters indicate like parts.

Figure 1:
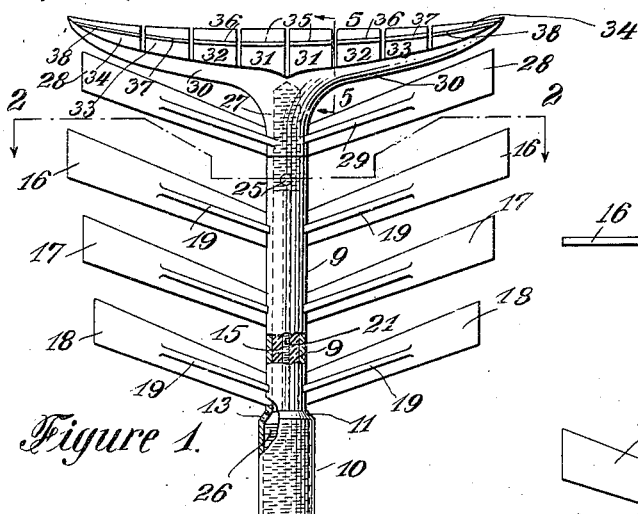
Figure 1 is a view of my improved bottle washer brush, showing the same partly in elevation and partly broken away.
Figure 4:
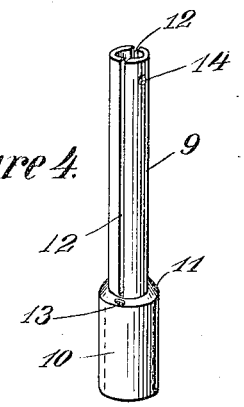
Fig. 4 is a perspective of a metallic ferrule forming a part of the brush, and used to hold together various parts thereof.
Figure 5:
Fig. 5 is a section on the line 5—5 of Fig. 1, looking in the direction indicated by the arrows.

A ferrule 9, made of metal and having the general proximate form of a cylinder, is provided with a base portion 10 and with a shoulder 11. A pair of slots 12 extend from the shoulder 11 to the upper end of the ferrule. The base portion 10 is provided with a hole 13 extending obliquely through its wall, as indicated in Fig. 1. The upper portion of the ferrule is provided with a pair of holes exactly alike and in registry with each other, one of them being shown at 24 in Fig. 4. The ferrule as a whole is hollow, and is open at each of its ends. The hole 13 is immediately adjacent the lower end of one of the slots 12, as indicated in Fig. 4.

Figure 3:
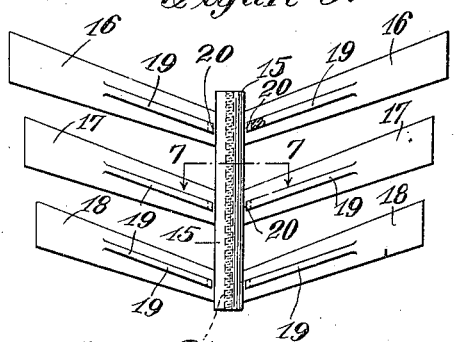
Fig. 3 is a view of one of the parts, consisting of a stem and wings extending therefrom.
Figure 7:
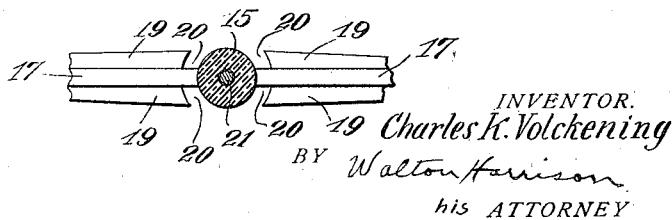
Fig. 7 is a section on the line 7—7 of Fig. 3, looking in the direction indicated by the arrows.

A stem 15, shown more particularly in Fig. 3, is made of rubber and is adapted to fit into the upper portion of the ferrule. Integral with this stem and extending from it are arms 16, 17, 18, made of rubber and arranged in pairs, as shown in Fig. 3, the arms of each pair having the same length which is different from the length of the arms of the other pairs. Each of these arms is provided with a pair of ribs 19, integral with it, and having the form indicated. Between each rib 19 and the adjacent portion of the stem 15 is a space 20, as indicated in Fig. 7.

Extending axially through the rubber stem 15 is a bracing rod 21, made of steel or other metal and roughened, preferably by being threaded. The stem 15 is vulcanized directly upon this bracing rod, or the bracing rod is forced endwise through the stem, which is cored for the purpose. The ends of the bracing rod are flush with the ends of the stem, as shown in Fig. 3.

Figure 6:
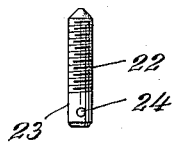
Fig. 6 is an elevation of a screw stem, used in connection with the ferrule for holding together certain parts.
Figure 8:
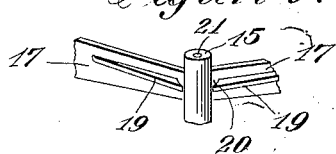
Fig. 8 is a fragmentary perspective of the stem and parts adjacent thereto, shown in Fig. 3.

A metallic stem 22, of the form shown in Fig. 6, is threaded throughout about three-quarters of its length and is provided with a smooth portion 23, and with a hole 24 extending through this portion. A pin 25 is of suitable size to extend through this hole 24 and through the holes 14, and is made of steel or other more or less malleable metal.

The stem 15, carrying the arms 16, 17, 18, is thrust endwise into the ferrule, so that the lower edges of the arms 18 are brought into immediate proximity to the shoulder 11. This leaves the hole 13 unobstructed, owing to the inclination of the shoulder 11, as shown in Fig. 1.

The ribs 19 at their inner ends fit neatly against the adjacent surfaces of the ferrule, the inner ends of the ribs being of proper form for this purpose, as may be understood from Fig. 7.

Figure 2:
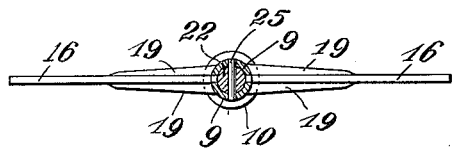
Fig. 2 is a section on the line 2—2 of Fig. 1, looking in the direction indicated by the arrows.

The stem 15 being in position, the arms 16, 17, 18 of course extend through the slots 12, as shown in Figs. 1 and 2. The threaded stem 22 is next placed in the top end of the ferrule, the hole 24 being brought into registry with the holes 14. Next the pin 25 is driven through all of these holes, and this done the ends of the pin are hammered slightly, so that the pin becomes riveted and thus holds the stem 22 firmly within the upper end of the ferrule, the threaded portion of the stem 22 being exposed. Thus the metallic stem 22 serves to hold in position the body portion 15 or, in other words, the rubber stem carrying the arms.

The base portion 10 of the ferrule is provided internally with a thread 26, as may be understood from Fig. 1. By aid of this thread the ferrule may be secured upon a hollow spindle used in a bottle washing machine, and through which water is supplied for washing bottles.

A head 27, of rubber is cored out a little and screwed upon the metallic stem 22, the resilience of the rubber insuring a close fit, so that the head is jammed close down upon the top of the ferrule, as indicated in Fig. 1. Integral with the head 27 are a pair of arms 28 provided with ribs 29, these ribs having nearly the same form as the ribs 19, but differing therefrom in that the inner ends of the ribs 29 merge integrally into the head 27. Branching from the head 27 and integral therewith are two arms 30, the head 27 and arms 30 having together a proximate fish-tail form. Extending from these arms are a number of fins 31, 32, 33, 34 of varying length. These fins carry ribs 35, 36, 37, 38.

The arms 30 and fins carried thereby are of such form as to readily reach all parts of the bottom of the bottle, the bottom being slightly curved.

I find that by arranging the arms in pairs, the arms of each pair being directly opposite each other as shown, the arms can readily be brought into engagement with all portions of the internal surface of the bottle. I also find that by making the arms of different lengths, that is, by making the arms 16 rather lengthy, the arms 17 a little shorter, and the arms 18 still shorter, the arms are thereby better adapted for reaching the internal surfaces of the bottle, and especially such surfaces as are adjacent the neck of the bottle. Again by differentiating the lengths of the arms, I cause the long arms to curve more than the shorter ones, and by doing this I cause the arms, while in action inside of the bottle, to be brought into good engagement with the internal surface thereof. That is to say, there is no chance for any portion of the surface in question to be skipped, as a spot that is not engaged by one arm will be engaged by another arm either lower down or higher up. Thus the cleaning is thorough.

The operation of my device is as follows:

The parts being assembled as above described and as indicated in Fig. 1, the brush is ready for use. The base portion 10 being fitted upon a hollow spindle of a bottle washing machine, the brush is used as other brushes employed in this art for the same general purpose.

Water escapes from the hole 13 while the brush is in action, and as the brush is rotated rapidly the various arms and fins are brought into engagement with the various internal portions of the bottle.

I claim:—

1. In a bottle washer brush the combination of a hollow metallic ferrule provided with slots extending flush with the end thereof, a stem detachably fitted into the end of said ferrule and provided with rubber arms extending outwardly through said slots, a threaded metallic stem provided with a smooth portion extending into said ferrule, a pin extending through said stem and the end portion of said ferrule, and a head mounted upon said metallic stem and provided with flexible arms.

2. As an article of manufacture, a brush member made of rubber and comprising a body portion having a number of arms integral with said body portion, said arms being arranged in pairs and the arms of each pair being in juxtaposition, the arms of one pair extending farther than the arms of another pair from the general axis of said body portion, and a member of resilient material carried by said body portion and having a proximate fish-tail form.

3. In a bottle washer brush the combination of a centrally disposed cylindrical body member provided with a number of arms member made of rubber and extending obliquely therefrom, the arms being arranged in pairs and the arms of each pair being in juxtaposition, the arms of one pair extending further than the arms of another pair, measured outwardly from the general axis of said body member, and a tip made of resilient material and mounted upon said stem, said tip having a fish-tail form.

4. As an article of manufacture a brush member having an axially disposed rubber stem and a number of rubber arms integral with said stem and extending directly therefrom, said arms being arranged in pairs and the arms of each pair being in juxta-position, the arms of one pair extending further than the arms of another pair from the general axis of said body member, and a tip made of rubber and carried by said stem, said tip having a fish-tail form.

CHARLES K. VOLCKENING.